SETTING UP OF TANDEM CONNECTIONS

Filed Jan. 30, 1953 3 Sheets-Sheet 1

INVENTORS
ANTON KRISTIAN DIESEN
SVEN BERTIL FORSS
BY [signature]
ATTORNEY

SETTING UP OF TANDEM CONNECTIONS

Filed Jan. 30, 1953 3 Sheets-Sheet 2

INVENTORS
ANTON KRISTIAN DIESEN
SVEN BERTIL FORSS
BY [signature]
ATTORNEY

INVENTORS
ANTON KRISTIAN DIESEN
SVEN BERTIL FORSS
BY Fredrick G. Hary
ATTORNEY

United States Patent Office 2,718,558

Patented Sept. 20, 1955

2,718,558

SETTING UP OF TANDEM CONNECTIONS

Anton Kristian Diesen, Hagersten, and Sven Bertil Forss, Stockholm, Sweden, assignors to Telefonaktiebolaget L M Ericsson, Stockholm, Sweden, a Swedish company Application January 30, 1953, Serial No. 334,268

2 Claims. (Cl. 179—27)

This invention relates to telephone exchanges having at least some manually served lines, preferably toll lines, which are normally marked busy under the control of an operator. When all lines within a traffic route are normally marked busy under the control of an operator the problem arises how to set up tandem connections to the traffic route under the control of other operators. The operator of the traffic route is in the following called "A-operator" and the operator connecting tandem calls is called "B-operator."

The system, which has hitherto been used in toll exchanges, in the cases indicated here, implies that the B-operator communicates with the A-operator over separate lines, e. g. a local exchange, and asks to obtain a line. All outgoing lines are numbered and the A-operator indicates the number of the line to be used. Then the B-operator sets up a communication to this line and waits until it is marked free by the A-operator, which occurs e. g. after the end of the proceeding call. This system is rather cumbersome and time-consuming.

This invention has for a purpose to attain a simpler system based upon the fact that the B-operator generally does not need to connect herself to a determined line but only dials a direction number for the busy traffic route. Thus a line is selected automatically by means of a selecting device and the B-operator obtains communication with the A-operator supervising this line. Generally the line will be free after some waiting and the A-operator releases the line when it becomes free and then the B-operator receives a signal and sets up the tandem connection.

This is achieved according to the invention by means of a relay for each of the lines normally marked busy so as to connect the line alternatively to the operator that supervises the line, and said selecting device, and by a key pertaining to the line, by means of which said relay is operated when the line is marked free for tandem traffic.

The invention will be described more closely with a reference to the annexed drawings, Figs. 1–4.

Figure 1:
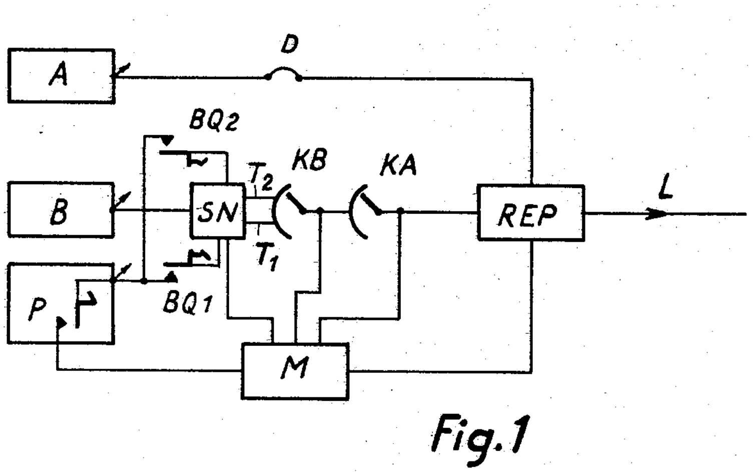
Fig. 1 shows a circuit diagram for a telephone exchange, where the B-operators select traffic routes by means of route designating keys P.

In Fig. 1 L is a toll line which is permanently connected to the operator's position A over an intermediate frame D. By means of a relay in a line equipment REP the line L may be connected alternatively to the position A and a selecting device KA—KB. A second operator's position B is provided with a number of connecting links SN, which by means of the selecting device KA—KB may be connected to the line equipments REP. To each link there belong two outlets T1—T2, each having a key BQ1 and BQ2, respectively, which are depressed when the link is used. By means of push-buttons P, one for each traffic route, a marker M is set, which selects a line L and interconnects it with the connecting link SN by means of the selecting device KA—KB.

Figure 2:
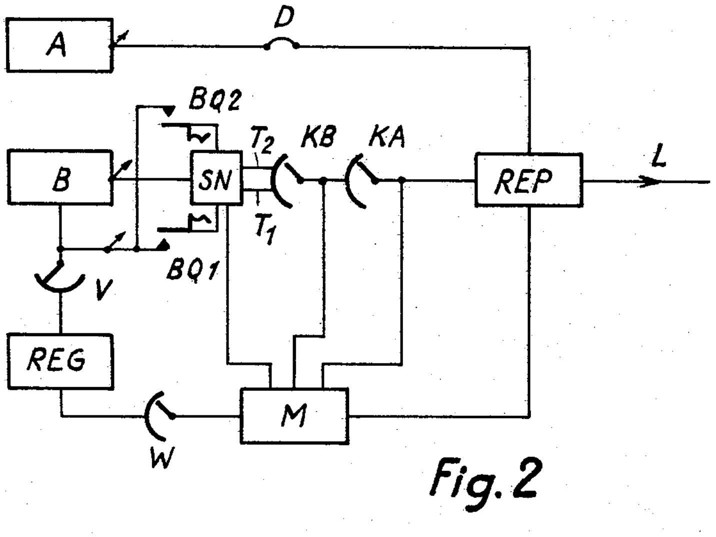
Fig. 2 shows a circuit diagram for a telephone exchange, where the B-operators select traffic routes by means of a dial and a register REG.

Fig. 2 differs from Fig. 1 only by the push-buttons P having been replaced by registers REG, which are connected over selectors V to the positions B. The register REG is set from the position B by means of impulses from a dial or a key sender. After the register has been connected it is connected to the marker M over a selector W and transmits its setting to the marker. The marker then sets up a communication between the connecting link SN and the line L.

The switching operation in Fig. 1 will be described below in detail in connection with Figs. 3 and 4.

Figure 3:
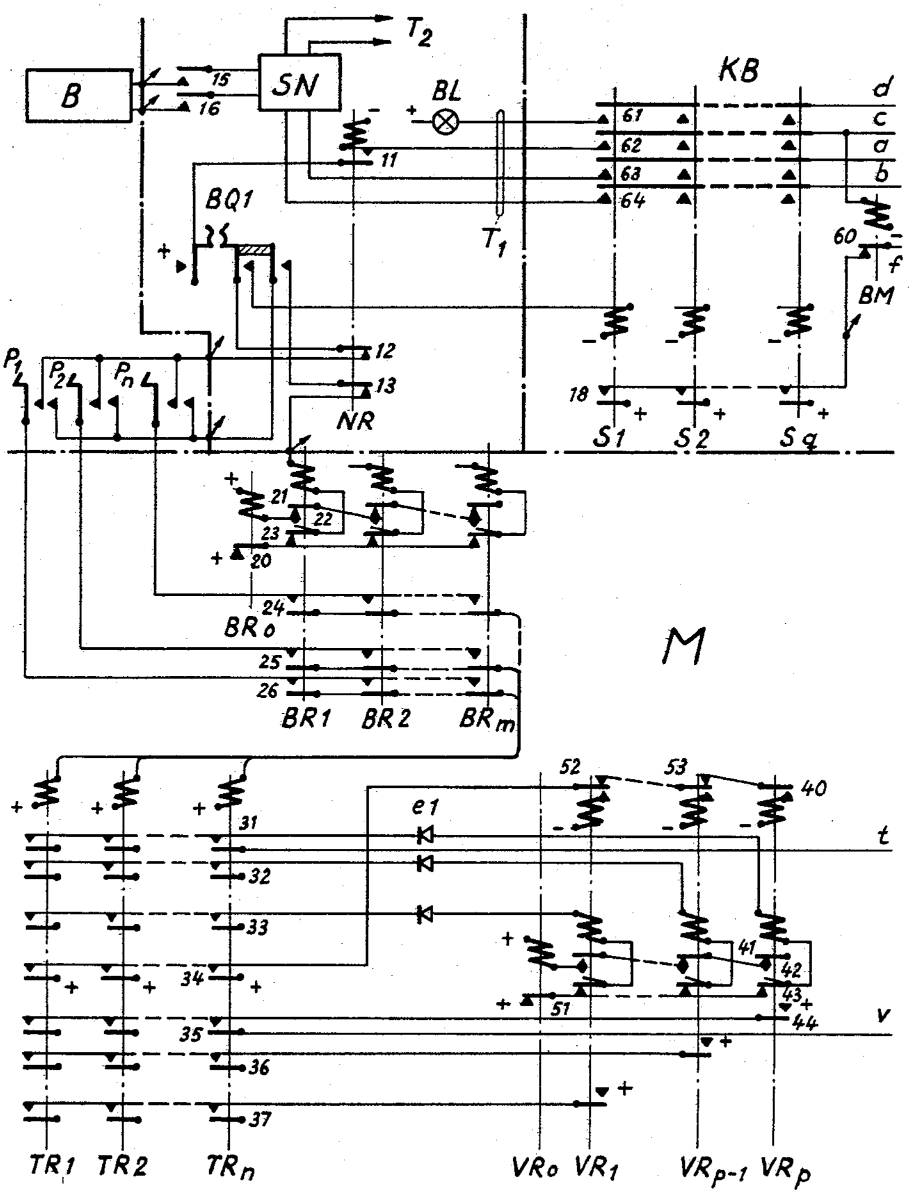
Fig. 3 shows the operator's equipments, a marker for the selecting device and a part of the same in a telephone exchange according to Fig. 1.

In Fig. 3 B is a B-operator's position, SN a connecting link in the same having two outlets T1 and T2, which are supposed to be completely alike. To each outlet there pertain a key BQ and a relay NR and a lamp BL. To the position B there pertains a number of push-buttons P1–P*n*, one for each traffic route. Each operator's position B has moreover a relay in a relay chain BR0–BR*m* pertaining to the marker M. Each traffic route has a relay in a relay group TR1–TR*n* in the marker, which also contains a group of selecting relays VR0–VR*p*.

The selecting device consists of primary and secondary operating bars for cross bar switches, KA and KB, connected by means of links.

Figure 4:
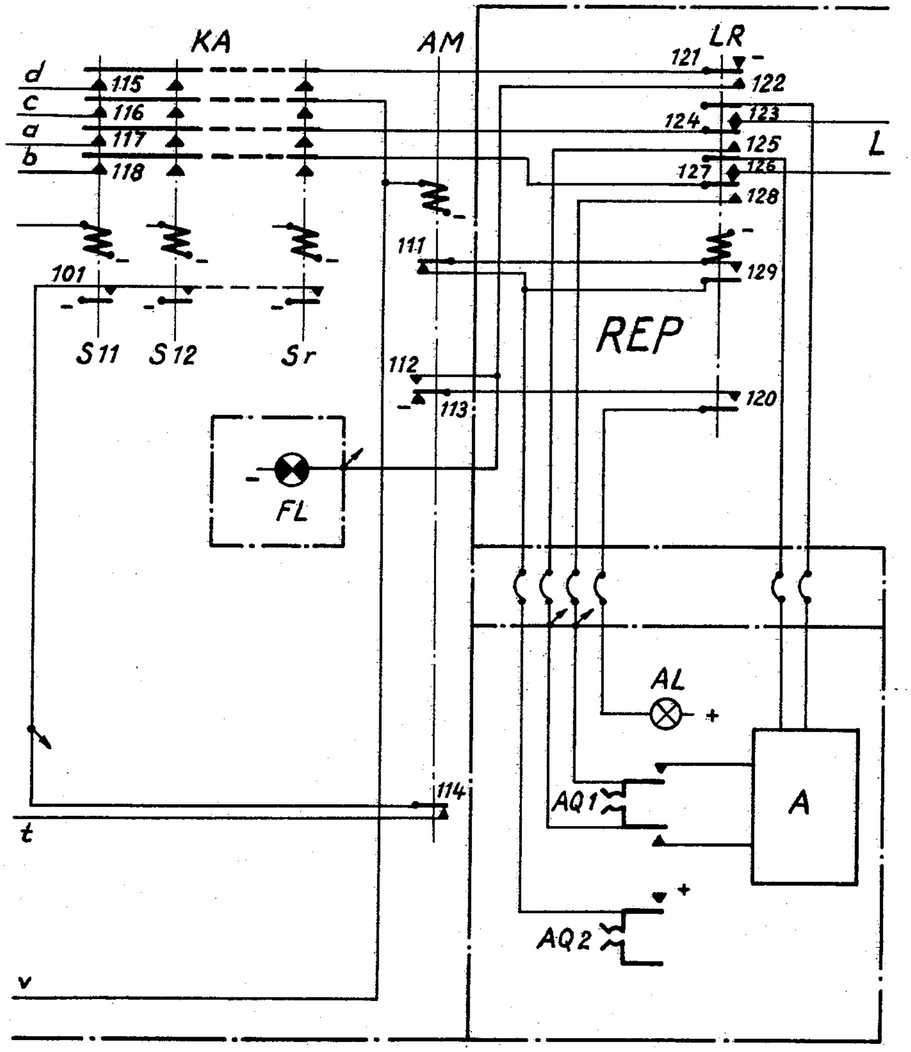
Fig. 4 shows the A-operator's position, a part of the selecting device and the controlling relay of a toll line.

In Fig. 4 there is shown a relay LR and a primary operating bar for cross bar switches, KA, which both pertain to the line L. The relay LR is supposed to be an integral part of the relay equipment REP of the line. Over an intermediate frame D the line L is connected to an A-position, where a lamp AL and a key AQ2 pertaining to the line are to be found. There is furthermore an answering key AQ1 common for all lines L interconnected to A.

If the tandem traffic is substantial there is suitably arranged a key AQ1 for each line L. The operator in Fig. 3 selects a free connecting link SN and depresses the key BQ for the same. At the same time the operator actuates a contact device 15—16, which connects the link SN to the position B. Then the one of the push buttons P1–P*n* is pushed, which corresponds to the traffic route over which a connection is desired. The following circuit is completed: +, contacts 20 and 23, winding on relay BR1, contact 13, make contact BQ1, e. g. the push button P*n*, contact 12, make contact BQ1, winding on the selecting magnet S1 for the operating bar for cross bar switches KB. The relay BR1 and the selecting magnet S1 attract their armatures. The contact 18 and the contacts 21—26 are actuated. The following circuit is completed: +, winding on relay TR*n*, contact 24, push buttons P*n*, contact 12, key BQ1, winding on the selecting magnet S1, to minus. The contacts 31—37 are actuated.

The contact 18 closes parallel-connected circuits for all free links *abcd*, which may be connected to the outlet T1, e. g. +, contacts 18 and 60, wire *t*, winding on selecting magnet S11 for the operating bar KA in Fig. 4, to minus. The selecting magnet S11 closes the contact 101 and indicates in such a way all free operating bars KA, which may be connected to the link *abcd*. Of these only one pertains to the traffic route indicated by the push button P*n*. The following circuit is completed: +, contacts 51 and 43, the lower winding of the relay VR*p*, rectifier *e*1, contact 31, wire *t*, contacts 114 and 101, to minus. Here it is supposed that the relay VR*p* attracts its armature. The contacts 40—44 are actuated. The relay VR*p* is kept energized over the contacts 34, 52—53 and 40 by means of its upper winding. The relay VR0 is connected by the contact 42 and actuates the contact 51, due to which the relays VR1–VR*p*1 are blocked. The operating magnet AM is operated in the following circuit: +, contacts 44 and 35, wire *v*, winding on operating magnet AM, to minus. The contacts 111—114 and 115—118 are actuated. The operating magnet BM is operated through a circuit over the contact 116 and the wire *c* in parallel with the magnet AM. The contacts 60 and 61—64 are actuated. The relay NR is kept operated over the wire *c* and the contact 62 in parallel with the magnets AM and BM. The contacts 11—13 are actuated. The relay NR and the operating magnets BM and AM are kept energized over the contact 11 and the make contact BQ1. The marker M is released, when the contacts 12 and 13 are actuated. When the line L in Fig. 4 is connected to the position A for supervision the key AQ2 is kept depressed. Thus the relay LR is operated over the contact 111 and attracts its armature. The contacts 120—129 are actuated. The relay LR remains operated through its contact 129 even if the contact 111 is closed. The line L is then connected to the position A over the contact 123 and 126. The lamp AL is lit. When an operator B is connected over the operating bar for cross bar switches KA the lamp AL in the position A begins to blink, because the contact 113 is closed and the contact 112 is actuated. FL is an impulse device. At the same time the lamp BL in Fig. 3 is lit with a blinking light owing to a circuit from FL over the contacts 122 and 115, wire *d* and contact 61. The operator in the position A answers the call by depressing her key AQ1. If the line L can be made free the operator in the position B is advised of that and queues up. When the operator in the position A finds the line L free she releases the key AQ2 for a moment, so that the relay LR releases its armature and depresses again the key AQ2. As the contact 111 is now closed the relay LR cannot attract again. The line L is now connected to the operating bar for cross bar switches KA over the contacts 124 and 127 and is in communication with the connecting link SN over the contacts 117—118, the wires *a—b* and the contacts 63—64. The lamp AL in the position A is extinguished and the lamp BL in the position B is lit with a steady light by the contacts 120 and 122 being broken and the contact 121 being actuated. The operator in the position B can now connect the line L with another line, which in a similar way has been connected to the outlet T2 in Fig. 3.

When the tandem call over the connecting link SN is ended the operator in the position B releases the key BQ1. The operating magnets BM and AM release their armatures. The relay LR is attracted and connects the line L back to the position A. The lamp BL is extinguished and the lamp A1 is lit with a steady light. The line L is then again under the control of the operator A.

We claim:

1. In a toll-exchange a first and a second operator's position, a selecting device, a toll line, two links and a key for said toll line in said first operator's position, a relay connected to said toll line, said relay having a first set of contacts for holding the toll line connected to one of said links and a second set of contacts for holding the other of said two links connected to said selecting device, control means for connecting said second operator's position over said selecting device to said second set of contacts and marking a call in said first operator's position to said toll line, said key when actuated operating said relay and said contact sets so as to disconnect said first operator's position from the toll line and to connect the toll line to said second operator's position over said selecting device.

2. In a toll-exchange as described in claim 1, a second relay connected to said toll line and operated by said selecting device, said second relay having a contact which closes a circuit for said first relay over said key when the operator in said second operator's position releases said selecting device, the toll line thereby being automatically connected back to said first operator's position.

No references cited.